(12) United States Patent
Kurita

(10) Patent No.: US 10,035,398 B2
(45) Date of Patent: Jul. 31, 2018

(54) DAMPER CONTROL DEVICE

(71) Applicant: KYB Corporation, Tokyo (JP)

(72) Inventor: Norihiko Kurita, Gifu (JP)

(73) Assignee: KYB Corporation, Tokyo (JP)

( * ) Notice: Subject to any disclaimer, the term of this patent is extended or adjusted under 35 U.S.C. 154(b) by 39 days.

(21) Appl. No.: 15/125,240

(22) PCT Filed: Jul. 22, 2015

(86) PCT No.: PCT/JP2015/070773
§ 371 (c)(1),
(2) Date: Sep. 12, 2016

(87) PCT Pub. No.: WO2016/013559
PCT Pub. Date: Jan. 28, 2016

(65) Prior Publication Data
US 2017/0072762 A1    Mar. 16, 2017

(30) Foreign Application Priority Data
Jul. 22, 2014   (JP) ................................. 2014-148447

(51) Int. Cl.
*B60G 17/08* (2006.01)
*B60G 17/015* (2006.01)
(Continued)

(52) U.S. Cl.
CPC ......... *B60G 17/015* (2013.01); *B60G 17/018* (2013.01); *B60G 17/08* (2013.01);
(Continued)

(58) Field of Classification Search
CPC .... B60G 17/015; B60G 17/018; B60G 17/08; B60G 2202/24; B60G 2202/414; B60G 400/20; B60G 400/50; B60G 2400/50; B60G 500/10; B60G 2500/11; G60G 2600/14; F16F 9/46; F16F 9/512

USPC .......................................................... 701/37
See application file for complete search history.

(56) References Cited

U.S. PATENT DOCUMENTS 5,207,300 A * 5/1993 Engel ..................... B60G 17/08
188/266.2
5,408,411 A * 4/1995 Nakamura ......... B60G 17/0182
701/48
(Continued)

FOREIGN PATENT DOCUMENTS

JP    H06-173996 A    6/1994

OTHER PUBLICATIONS

Wenlin et al., A Changeable Damping Strategy for the Sky-Hook Control of a Rail Vehicle Semi active Hydraulic Damper with Parallel Orifices, 2010, IEEE, p. 22-26.*
(Continued)

*Primary Examiner* — Mcdieunel Marc
(74) *Attorney, Agent, or Firm* — Rabin & Berdo, P.C.

(57) ABSTRACT

A damper control device feeds back a pressure within an extension-side chamber to control an extension-side solenoid valve that adjusts the pressure within the extension-side chamber, and feeds back a pressure within a compression-side chamber to control a compression-side solenoid valve that adjusts the pressure within the compression-side chamber. The damper control device performs a compression-side reduction correction which reduces a compression-side current supplied to the compression-side solenoid valve during extension of a damper, and performs an extension-side reduction correction which reduces an extension-side current supplied to the extension-side solenoid valve during contraction of the damper.

6 Claims, 7 Drawing Sheets

(51) Int. Cl.
*F16F 9/46* (2006.01)
*F16F 9/512* (2006.01)
*B60G 17/018* (2006.01)

(52) U.S. Cl.
CPC ............... *F16F 9/46* (2013.01); *F16F 9/512* (2013.01); *B60G 2202/24* (2013.01); *B60G 2202/414* (2013.01); *B60G 2400/20* (2013.01); *B60G 2400/50* (2013.01); *B60G 2500/10* (2013.01); *B60G 2500/11* (2013.01); *B60G 2600/14* (2013.01)

(56) References Cited

U.S. PATENT DOCUMENTS

| | | | |
|---|---|---|---|
| 6,513,797 B2 * | 2/2003 | Sawai | B60G 17/0416 |
| | | | 188/322.17 |
| 8,840,118 B1 * | 9/2014 | Giovanardi | F15B 13/0444 |
| | | | 280/124.157 |
| 9,114,683 B2 * | 8/2015 | Kikuchi | B60G 17/015 |
| 9,446,649 B2 * | 9/2016 | Kurita | B62K 25/04 |
| 9,550,404 B2 * | 1/2017 | Giovanardi | F15B 13/0444 |
| 9,751,373 B2 * | 9/2017 | Kurita | B60G 17/016 |
| 2015/0239317 A1 * | 8/2015 | Kurita | B62K 25/04 |
| | | | 701/38 |
| 2017/0182859 A1 * | 6/2017 | Anderson | B60G 17/052 |
| 2017/0225536 A1 * | 8/2017 | Kurita | B60G 17/08 |

OTHER PUBLICATIONS

Bai et al., Magnetorheological Damper Utilizing an Inner Bypass for Ground Vehicle Suspensions, 20013, IEEE, p. 3422-3425.*

* cited by examiner

DAMPER CONTROL DEVICE

TECHNICAL FIELD

The present invention relates to a damper control device.

BACKGROUND ART

A damper for a vehicle is interposed between a vehicle body and a vehicle wheel of the vehicle and suppresses vibrations of the vehicle body and the vehicle wheel by exerting a damping force when extending/contracting. Among such dampers, there are passive dampers that exert a damping force with preset damping force characteristics (characteristics of the damping force generated by the damper relative to an extension/contraction speed of the damper), as well as dampers that vary the damping force in order to enhance the riding comfort in the vehicle and control the vehicle body posture.

As disclosed in JP6-173996A, dampers that vary the damping force are provided with an extension-side solenoid valve that controls the pressure within an extension-side chamber, and a compression-side solenoid valve that controls the pressure within a compression-side chamber. The opening of the extension-side solenoid valve and the opening of the compression-side solenoid valve are regulated by a damper control device, and the damping force exerted by the damper is controlled by the damper control device.

SUMMARY OF INVENTION

As a method for controlling the damping force of a damper like that disclosed in JP6-173996A, there is a method in which the pressures of the extension-side chamber and the compression-side chamber are detected, and these pressures are fed back to regulate currents supplied to the extension-side solenoid valve and the compression-side solenoid valve, thereby adjusting the pressures of the extension-side chamber and the compression-side chamber to a target pressure.

In this method, an extension-side feedback loop for feeding back the pressure of the extension-side chamber in order to control the extension-side solenoid valve and a compression-side feedback loop for feeding back the pressure of the compression-side chamber in order to control the compression-side solenoid valve are necessary.

The damping force during the extension stroke of the damper is controlled by regulating a current supplied to the extension-side solenoid valve to adjust the pressure of the extension-side chamber. In contrast, in the contraction stroke of the damper, the extension-side solenoid valve does not affect a change in the damping force, but a target pressure during the extension stroke is continuously input into the extension-side feedback loop. Therefore, as shown in FIG. 6, a current command which indicates the magnitude of the current supplied to the extension-side solenoid valve reaches a maximum during the contraction stroke of the damper.

This occurs because a pressure that is decreased due to expansion of the extension-side chamber during the contraction stroke of the damper is input, as the actual pressure of the extension-side chamber into the extension-side feedback loop together with the target pressure during the extension stroke, and thus a deviation between the target pressure and the actual pressure increases. On the other hand, during the extension stroke of the damper, a current command to the compression-side solenoid valve reaches a maximum due to the same phenomenon.

In this way, a current is supplied to the extension-side solenoid valve and the compression-side solenoid valve even while they are not affecting the change in the damping force, and this leads to an increase in power consumption. Further, since a large current is continuously supplied, the amount of heat generated in the solenoid valves increases, and thus it becomes difficult to increase the thrust of the solenoid valves.

The present invention has an object to provide a damper control device that saves power and has solenoid valves capable of generating a larger thrust.

According to one aspect of the present invention, a damper control device for controlling a damping force of a damper having an extension-side chamber and a compression-side chamber which are filled with a working fluid is provided. The damper control device feeds back a pressure within the extension-side chamber to control an extension-side solenoid valve that adjusts the pressure within the extension-side chamber, and feeds back a pressure within the compression-side chamber to control a compression-side solenoid valve that adjusts the pressure within the compression-side chamber. The damper control device performs a compression-side reduction correction which reduces a compression-side current supplied to the compression-side solenoid valve during extension of the damper. The damper control device performs an extension-side reduction correction which reduces an extension-side current supplied to the extension-side solenoid valve during contraction of the damper.

DESCRIPTION OF EMBODIMENTS

Figure 1:
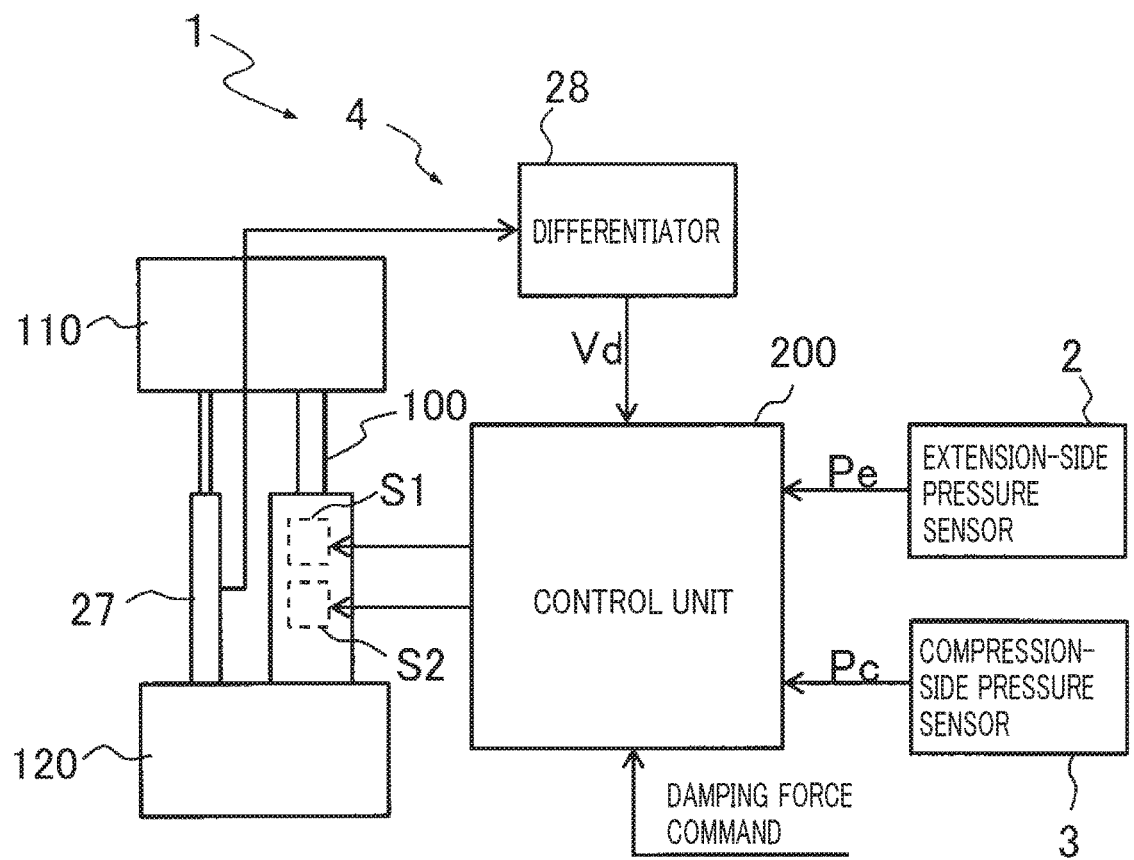
FIG. 1 is a schematic constitutional view of a damper control device according to an embodiment of the present invention.

An embodiment of the present invention will now be explained below referring to the drawings.

Figure 2:
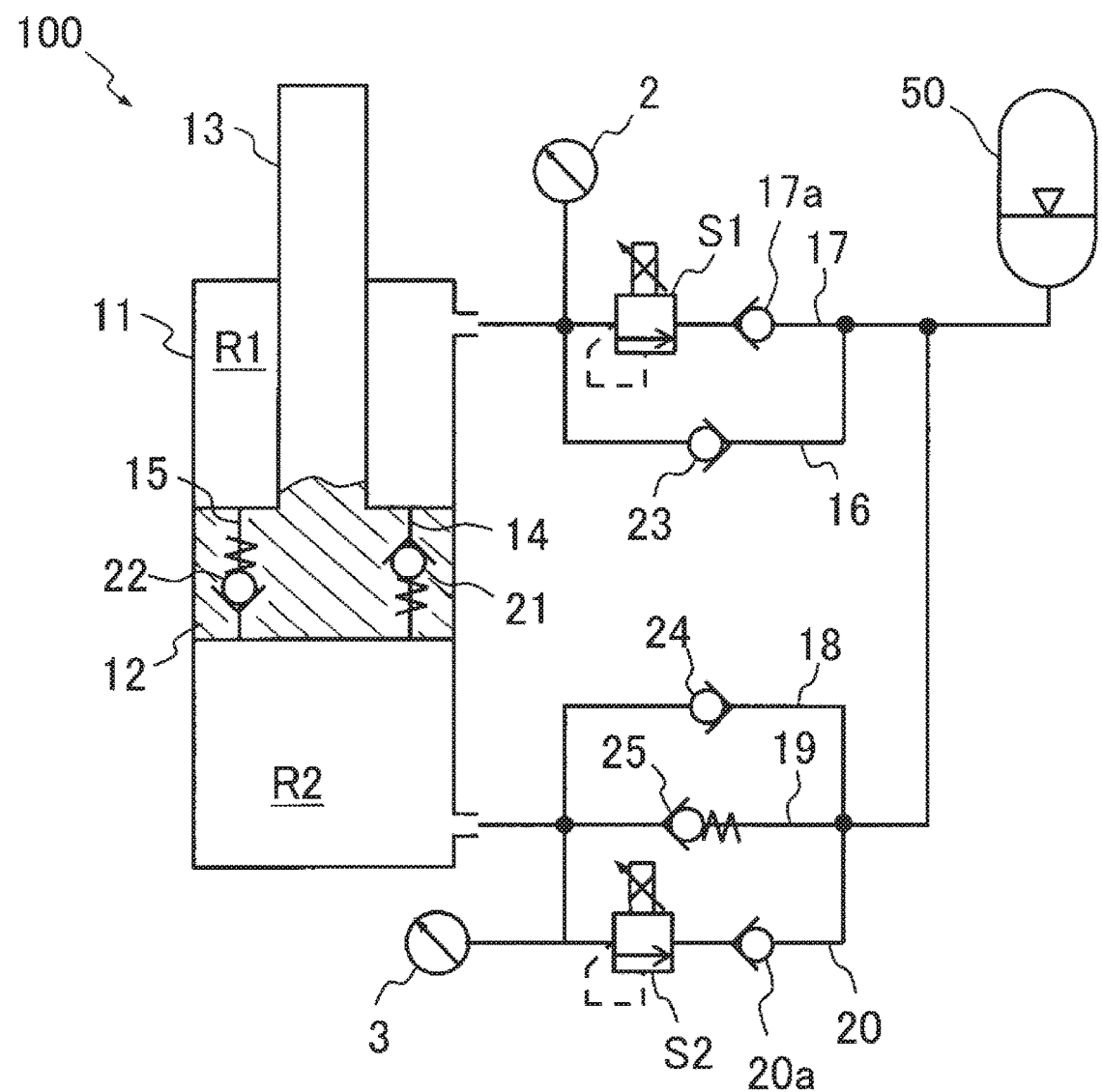
FIG. 2 is a circuit constitutional view of the damper.

A damper control device 1 controls a damping force of a damper 100 interposed between a sprung member 110 and an unsprung member 120 of a vehicle. As shown in FIGS. 1 and 2, the damper control device 1 includes an extension-side pressure sensor 2 that detects a pressure of an extension-side chamber R1 within the damper 100; a compression-side pressure sensor 3 that detects a pressure of a compression-side chamber R2 within the damper 100; a speed sensor 4 that detects an extension/contraction speed Vd of the damper 100; and a control unit 200 that controls an extension-side solenoid valve S1 and a compression-side solenoid valve S2 provided in the damper 100 on the basis of the pressure detected by the extension-side pressure sensor 2, the pressure detected by the compression-side pressure sensor 3, and the extension/contraction speed Vd detected by the speed sensor 4.

As shown in FIG. 2, the damper 100 includes the following: a cylinder 11; a piston 12 that is slidably inserted into the cylinder 11; a piston rod 13 that is moveably inserted into the cylinder 11 and connected to the piston 12; the extension-side chamber R1 and the compression-side chamber R2 that are partitioned by the piston 12 within the cylinder 11 and are filled with a working fluid; a reservoir 50 that pressurizes and stores the working fluid; passages 14 and 15 that establish communication between the extension-side chamber R1 and the compression-side chamber R2; passages 16 and 17 that establish communication between the extension-side chamber R1 and the reservoir 50; passages 18, 19, and 20 that establish communication between the extension-side chamber R2 and the reservoir 50; an extension-side damping valve 21 that is provided in the passage 14 and applies resistance to the flow of working fluid from the extension-side chamber R1 toward the compression-side chamber R2; a compression-side auxiliary damping valve 22 that is provided in the passage 15 and applies resistance to the flow of working fluid from the compression-side chamber R2 toward the extension-side chamber R1; an extension-side check valve 23 that is provided in the passage 16 and permits only the flow of working fluid from the reservoir 50 toward the extension-side chamber R1; the extension-side solenoid valve S1 that is provided in the passage 17 and applies resistance to the flow of working fluid from the extension-side chamber R1 toward the reservoir 50; a compression-side check valve 24 that is provided in the passage 18 and permits only the flow of working fluid from the reservoir 50 toward the compression-side chamber R2; a compression-side damping valve 25 that is provided in the passage 19 and applies resistance to the flow of working fluid from the compression-side chamber R2 toward the reservoir 50; and the compression-side solenoid valve S2 that is provided in the passage 20 and applies resistance to the flow of working fluid from the compression-side chamber R2 toward the reservoir 50. For the working fluid, in addition to hydraulic oil, water, an aqueous solution, and a gas can be used.

During the extension stroke of the damper 100, the pressure of the extension-side chamber R1 that is compressed by the piston 12 rises, and working fluid moves from the extension-side chamber R1 to the compression-side chamber R2 via the extension-side damping valve 21 and is discharged to the reservoir 50 via the extension-side solenoid valve S1. The volume of the compression-side chamber R2 expands due to the movement of the piston 12, and working fluid flows into the compression-side chamber R2 from the extension-side chamber R1 and the compression-side check valve 24 opens so that insufficient working fluid is supplied into the compression-side chamber R2 from the reservoir 50. Therefore, the pressure within the compression-side chamber R2 becomes a reservoir pressure, and the damper 100 exerts an extension-side damping force corresponding to the differential pressure between the extension-side chamber R1 and the compression-side chamber R2, thereby suppressing the extension of the damper 100 itself. Therein, by regulating the valve opening pressure of the extension-side solenoid valve S1, the pressure within the extension-side chamber R1 can be regulated. Thereby, the extension-side damping force of the damper 100 can be controlled.

During the contraction stroke of the damper 100, the pressure of the compression-side chamber R2 that is compressed by the piston 12 rises, and working fluid moves from the compression-side chamber R2 to the extension-side chamber R1 via the compression-side auxiliary damping valve 22 and is discharged to the reservoir 50 via the compression-side solenoid valve S2 and the compression-side damping valve 25. The volume of the extension-side chamber R1 expands due to the movement of the piston 12, and working fluid flows into the extension-side chamber R1 from the compression-side chamber R2 and the extension-side check valve 23 opens so that working fluid is supplied into the extension-side chamber R1 also from the reservoir 50. In this case, the pressure within the extension-side chamber R1 becomes a reservoir pressure, and the damper 100 exerts a compression-side damping force corresponding to the differential pressure between the compression-side chamber R2 and the extension-side chamber R1, thereby suppressing the contraction of the damper 100 itself. Therein, by regulating the valve opening pressure of the compression-side solenoid valve S2, the pressure within the compression-side chamber R2 can be regulated. Thereby, the compression-side damping force of the damper 100 can be controlled.

The extension-side pressure sensor 2 is provided in the passage 17 more toward the extension-side chamber R1 than the extension-side solenoid valve S1, and detects the pressure within the extension-side chamber R1. The location for installing the extension-side pressure sensor 2 is not limited to the location mentioned above, and the extension-side pressure sensor 2 can be directly attached to the cylinder 11 to detect the pressure within the extension-side chamber R1.

The compression-side pressure sensor 3 is provided in the passage 20 more toward the compression-side chamber R2 than the compression-side solenoid valve S2, and detects the pressure within the compression-side chamber R2. The location for installing the compression-side pressure sensor 3 is not limited to the location mentioned above, and the compression-side pressure sensor 3 can be directly attached to the cylinder 11 to detect the pressure within the compression-side chamber R2.

The speed sensor 4 is constituted by a stroke sensor 27 that detects an extension/contraction displacement of the damper 100, and a differentiator 28 that differentiates the extension/contraction displacement of the damper 100 detected by the stroke sensor 27 to calculate an extension/contraction speed Vd of the damper 100. The speed sensor 4 is not limited to the above-described constitution, and can also calculate the extension/contraction speed Vd of the damper 100 from an acceleration acting on the sprung member no and the unsprung member 120. For example, the speed sensor 4 can also calculate the extension/contraction speed Vd of the damper 100 by detecting the accelerations in the up-down direction of the sprung member no and the unsprung member 120, integrating the detected accelerations to calculate the up-down direction speed of the sprung member no and the up-down direction speed of the unsprung member 120, and subtracting the up-down direction speed of the unsprung member 120 from the up-down direction speed of the sprung member 110.

The extension-side solenoid valve S1 is an electromagnetic valve device having a valve body (not illustrated) in which pressure of the working fluid from the upstream side acts in a valve opening direction, and a solenoid (not illustrated) that drives the valve body in a valve closing direction. The valve body of the extension-side solenoid valve S1 opens when a force in the valve opening direction generated by the pressure of the working fluid exceeds a thrust in the valve closing direction generated by the solenoid, thereby opening the passage 17. In other words, the valve opening pressure of the extension-side solenoid valve S1 is determined by the magnitude of a current supplied to the solenoid, and the valve opening pressure also increases when the current is increased. In the passage 17 in which the extension-side solenoid valve S1 is provided, a check valve 17a that permits only the flow of working fluid from the extension-side chamber R1 toward the reservoir 50 is provided. If the extension-side solenoid valve S1 functions as a check valve, the check valve 17a may be eliminated.

Similar to the extension-side solenoid valve S1, the compression-side solenoid valve S2 is an electromagnetic valve device having a valve body (not illustrated) in which pressure of the working fluid from the upstream side acts in the valve opening direction, and a solenoid (not illustrated) that drives the valve body in the valve closing direction. The valve body of the compression-side solenoid valve S2 opens when a force in the valve opening direction generated by the pressure of the working fluid exceeds a thrust in the valve closing direction generated by the solenoid, thereby opening the passage 20. In other words, the valve opening pressure of the compression-side solenoid valve S2 is determined by the magnitude of a current supplied to the solenoid, and the valve opening pressure also increases when the current is increased. In the passage 20 in which the compression-side solenoid valve S2 is provided, a check valve 20a that permits only the flow of working fluid from the compression-side chamber R2 toward the reservoir 50 is provided. If the compression-side solenoid valve S2 functions as a check valve, the check valve 20a may be eliminated.

The circuit constitution of the damper 100 is not limited to that described above, and the circuit can have any constitution as long as the pressure of the extension-side chamber R1 can be controlled by the extension-side solenoid valve S1 and the pressure of the compression-side chamber R2 can be controlled by the compression-side solenoid valve S2.

Figure 3:
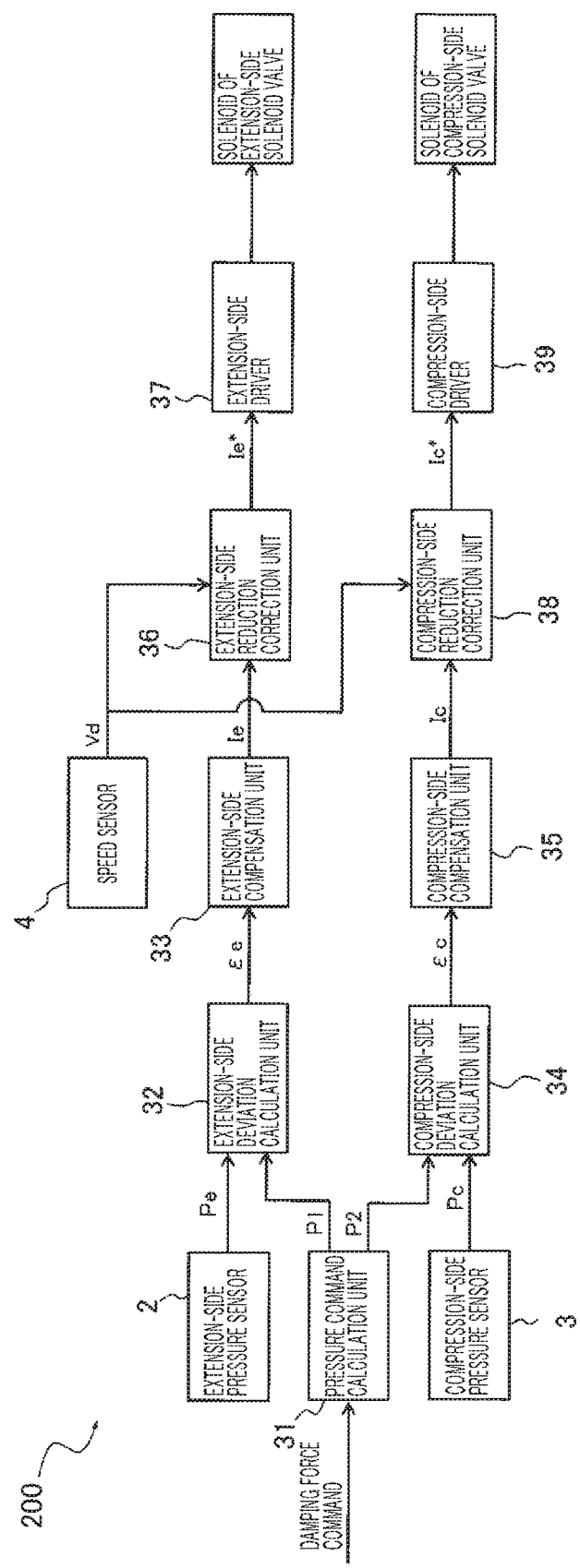
FIG. 3 is a control block diagram of the damper control device according to the embodiment of the present invention.

As shown in FIG. 3, the control unit 200 includes the following: a pressure command calculation unit 31 that calculates target pressures within the extension-side chamber R1 and within the compression-side chamber R2 based on a damping force command input from a vehicle control device (not illustrated) that controls the posture of the vehicle; an extension-side deviation calculation unit 32 that calculates an extension-side deviation εe between a target pressure P1 of the extension-side chamber R1 calculated by the pressure command calculation unit 31 and a pressure Pe detected by the extension-side pressure sensor 2; an extension-side compensation unit 33 that calculates an extension-side current command Ie as an extension-side current based on the extension-side deviation εe calculated by the extension-side deviation calculation unit 32; a compression-side deviation calculation unit 34 that calculates a compression-side deviation εc between a target pressure P2 of the compression-side chamber R2 calculated by the pressure command calculation unit 31 and a pressure Pc detected by the compression-side pressure sensor 3; a compression-side compensation unit 35 that calculates a compression-side current command Ic as a compression-side current based on the compression-side deviation εc calculated by the compression-side deviation calculation unit 34; an extension-side reduction correction unit 36 that corrects the extension-side current command Ie calculated by the extension-side compensation unit 33 to calculate a final extension-side final current command Ie*; an extension-side driver 37 that supplies a current based on the extension-side final current command Ie* to the solenoid of the extension-side solenoid valve S1; a compression-side reduction correction unit 38 that corrects the compression-side current command Ic calculated by the compression-side compensation unit 35 to calculate a final compression-side final current command Ic*; and a compression-side driver 39 that supplies a current based on the compression-side final current command Ic* to the solenoid of the compression-side solenoid valve S2.

The pressure command calculation unit 31 calculates the target pressures P1 and P2 within the extension-side chamber R1 and within the compression-side chamber R2 based on a damping force command input from the vehicle control device (not illustrated). The vehicle control device calculates a damping force to be output by the damper 100 from, for example, vibration information or the like such as the speed or acceleration of a sprung member of the vehicle. The pressure command calculation unit 31 outputs the target pressure P1 of the extension-side chamber R1 calculated based on the damping force command to the extension-side deviation calculation unit 32, and outputs the target pressure P2 of the compression-side chamber R2 to the compression-side deviation calculation unit 34.

The extension-side deviation calculation unit 32 calculates the extension-side deviation εe between the target pressure P1 of the extension-side chamber R1 calculated by the pressure command calculation unit 31 and the pressure Pe detected by the extension-side pressure sensor 2, and outputs the calculated extension-side deviation εe to the extension-side compensation unit 33.

The extension-side compensation unit 33 calculates the extension-side current command Ie based on the extension-side deviation εe calculated by the extension-side deviation calculation unit 32. Specifically, the extension-side compensation unit 33 calculates the extension-side current command Ie by adding the result obtained by multiplying the extension-side deviation εe by a proportional gain and the result obtained by multiplying a value resulting from integrating the extension-side deviation εe by an integral gain. In other words, the extension-side compensation unit 33 is a proportional-integral compensator that performs a proportional-integral operation on the extension-side deviation εe. The extension-side compensation unit 33 can be a proportional-integral-derivative compensator that performs not only a proportional-integral operation but also a derivative operation.

The compression-side deviation calculation unit 34 calculates the compression-side deviation εc between the target pressure P2 of the compression-side chamber R2 calculated by the pressure command calculation unit 31 and the pressure Pc detected by the compression-side pressure sensor 3, and outputs the calculated compression-side deviation εc to the compression-side compensation unit 35.

The compression-side compensation unit 35 calculates the compression-side current command Ic based on the compression-side deviation εc calculated by the compression-side deviation calculation unit 34. Specifically, the compression-side compensation unit 35 calculates the compression-side current command Ic by adding the result obtained by multiplying the compression-side deviation εc by a proportional gain and the result obtained by multiplying a value resulting from integrating the compression-side deviation εc by an integral gain. In other words, similar to the extension-side compensation unit 33, the compression-side compensation unit 35 is a proportional-integral compensator that performs a proportional-integral operation on the compression-side deviation εc. The compression-side compensation unit 35 can be a proportional-integral-derivative compensator that performs not only a proportional-integral operation but also a derivative operation. The proportional gain and the integral gain in the extension-side compensation unit 33 and the compression-side compensation unit 35 are set in consideration of the compressibility of the hydraulic oil and the mass of each unit.

The extension-side reduction correction unit 36 corrects the extension-side current command Ie based on the extension/contraction speed Vd of the damper 100 input from the speed sensor 4. Specifically, the extension-side reduction correction unit 36 calculates an extension-side reduction amount Me according to the extension/contraction speed Vd of the damper 100, and then calculates the extension-side final current command Ie*, which is a final current command, by subtracting the extension-side reduction amount Me from the extension-side current command Ie.

The extension-side reduction amount Me is set to 0 in the case that the extension/contraction speed Vd is a negative value indicating that the damper 100 is in the extension stroke, and in the case that the extension/contraction speed Vd is a positive value indicating that the damper 100 is in the contraction stroke and is less than an extension-side speed threshold value αe. On the other hand, in the case that the extension/contraction speed Vd is a positive value and is equal to or greater than the extension-side speed threshold value αe, the extension-side reduction amount Me is calculated by multiplying the absolute value |Vd| of the extension/contraction speed Vd by a gain βe. In other words, in the case that the extension/contraction speed Vd is a positive value and is equal to or greater than the extension-side speed threshold value αe, the extension-side reduction amount Me is calculated by Me=|Vd|·βe, and in all other cases, the extension-side reduction amount Me is set to 0.

The extension-side reduction correction unit 36 uses the extension-side reduction amount Me obtained as described above to calculate the extension-side final current command Ie*=Ie−Me, and then outputs the extension-side final current command Ie* to the extension-side driver 37.

Therefore, the extension-side reduction correction unit 36 substantially performs a correction to reduce the extension-side current command Ie in the case that the damper 100 is contracting at a speed that is equal to or greater than the predetermined extension-side speed threshold value αe. In other words, if the damper 100 is contracting and the absolute value of the extension/contraction speed Vd is equal to or greater than the absolute value of the extension-side speed threshold value αe, a correction for reducing the extension-side current command Ie is performed by the extension-side reduction correction unit 36. On the other hand, if the damper 100 is contracting and the absolute value of the extension/contraction speed Vd is less than the absolute value of the extension-side speed threshold value αe, the reduction correction is not performed.

Basically, when there is a situation in which the pressure within the extension-side chamber R1 cannot be controlled to the target pressure P1 because the volume of the extension-side chamber R1 is expanded, the extension-side reduction correction unit 36 performs a correction to reduce the extension-side current command Ie. The extension-side reduction correction unit 36 should perform the correction to reduce the extension-side current command Ie only in the above-described situation. Therefore, rather than always calculating the extension-side reduction amount Me, the extension-side reduction correction unit 36 can be configured to calculate the extension-side reduction amount Me and correct the extension-side current command Ie only when the reduction correction is necessary.

The extension-side reduction correction unit 36 can prepare in advance a map for calculating the extension-side reduction amount Me using the extension/contraction speed Vd of the damper 100 as a parameter, and calculate the extension-side reduction amount Me by map calculation.

The extension-side driver 37 has a PWM drive circuit and a current loop (not illustrated). The extension-side driver 37 detects a current flowing to the solenoid of the extension-side solenoid valve S1, feeds back the detected current to the extension-side final current command Ie* that was input, and performs control so that the current flowing to the solenoid becomes the extension-side final current command Ie*.

The compression-side reduction correction unit 38 corrects the compression-side current command Ic based on the extension/contraction speed Vd of the damper 100 input from the speed sensor 4. Specifically, the compression-side reduction correction unit 38 calculates a compression-side reduction amount Mc according to the extension/contraction speed Vd of the damper 100, and then calculates the compression-side final current command Ic*, which is a final current command, by subtracting the compression-side reduction amount Mc from the compression-side current command Ic.

The compression-side reduction amount Mc is set to 0 in the case that the extension/contraction speed Vd is a positive value indicating that the damper 100 is in the contraction stroke, and in the case that the extension/contraction speed Vd is a negative value indicating that the damper 100 is in the extension stroke and is greater than a compression-side speed threshold value αc. On the other hand, in the case that the extension/contraction speed Vd is a negative value and is equal to or less than the compression-side speed threshold value αc, the compression-side reduction amount Mc is calculated by multiplying the absolute value of the extension/contraction speed Vd by a gain βc. In other words, in the case that the extension/contraction speed Vd is a negative value and is equal to or less than the compression-side speed threshold value αc, the compression-side reduction amount Mc is calculated by Mc=|Vd|·βc, and in all other cases, the compression-side reduction amount Mc is set to 0.

The extension-side speed threshold value αe and the compression-side speed threshold value αc can be arbitrarily set, and these values can be set to the same value or different values. The extension-side speed threshold value αe and the compression-side speed threshold value αc are preferably set to a value near 0, for example, an absolute value of 0.5 m/s or less when the vehicle is a two-wheeled vehicle.

The compression-side reduction correction unit 38 uses the compression-side reduction amount Mc obtained as described above to calculate the compression-side final current command Ic*=Ic−Mc, and then outputs the compression-side final current command Ic* to the compression-side driver 39.

Therefore, the compression-side reduction correction unit 38 substantially performs a correction to reduce the compression-side current command Ic in the case that the damper 100 is extending at a speed that is equal to or less than the predetermined compression-side speed threshold value αc. In other words, if the damper 100 is extending and the absolute value of the extension/contraction speed Vd is equal to or greater than the absolute value of the compression-side speed threshold value αc, a correction for reducing the compression-side current command Ic is performed by the compression-side reduction correction unit 38. On the other hand, if the damper 100 is extending and the absolute value of the extension/contraction speed Vd is less than the absolute value of the compression-side speed threshold value αc, the reduction correction is not performed.

Basically, when there is a situation in which the pressure within the compression-side chamber R2 cannot be controlled to the target pressure P2 because the volume of the compression-side chamber R2 is expanded, the compression-side reduction correction unit 38 performs a correction to reduce the compression-side current command Ic. The compression-side reduction correction unit 38 should perform the correction to reduce the compression-side current command Ic only in the above-described situation. Therefore, rather than always calculating the compression-side reduction amount Mc, the compression-side reduction correction unit 38 can be configured to calculate the compression-side reduction amount Mc and correct the compression-side current command Ic only when the reduction correction is necessary.

The compression-side reduction correction unit 38 can prepare in advance a map for calculating the compression-side reduction amount Mc using the extension/contraction speed Vd of the damper 100 as a parameter, and calculate the compression-side reduction amount Mc by map calculation.

The compression-side driver 39 has a PWM drive circuit and a current loop (not illustrated). The compression-side driver 39 detects a current flowing to the solenoid of the compression-side solenoid valve S2, feeds back the detected current to the compression-side final current command Ic* that was input, and performs control so that the current flowing to the solenoid becomes the compression-side final current command Ic*.

Figure 4:
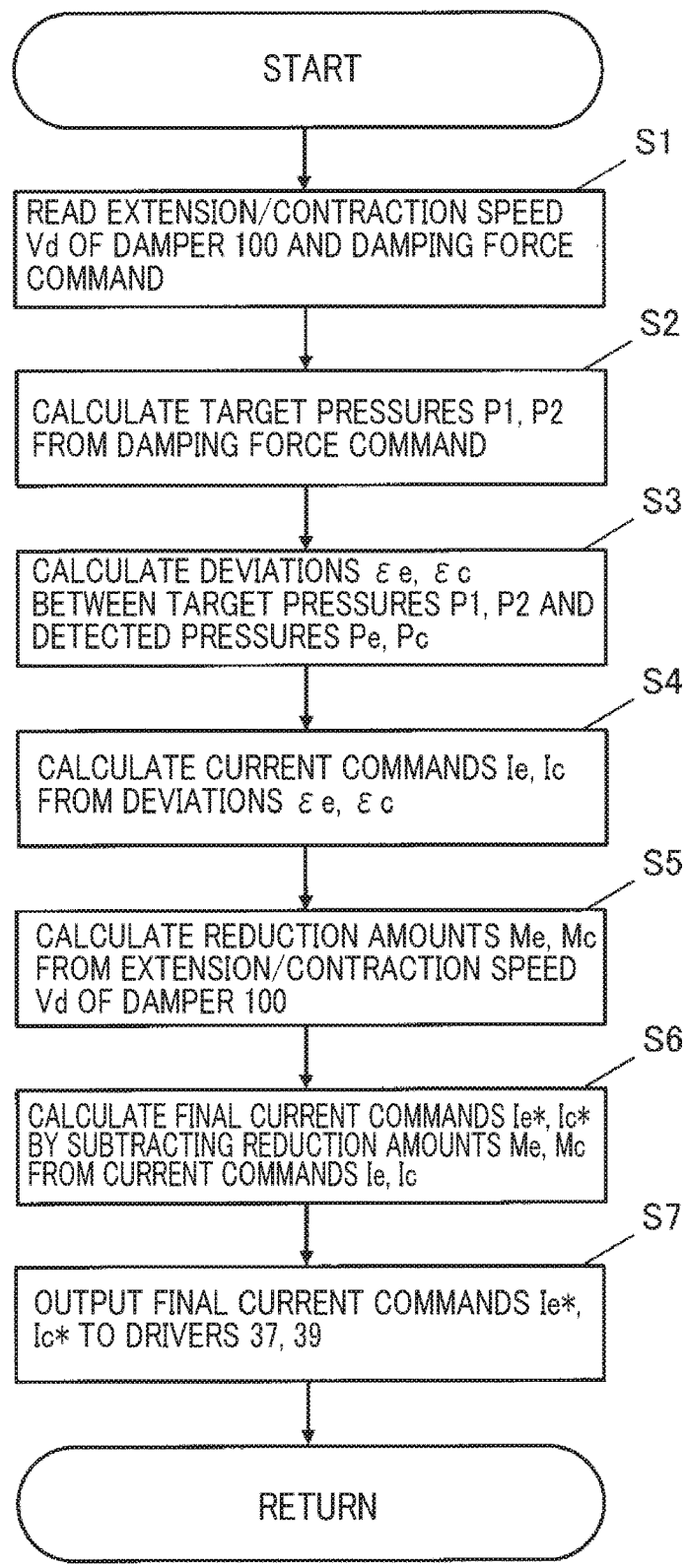
FIG. 4 is a flowchart illustrating a processing procedure of the damper control device according to the embodiment of the present invention.

The calculation of the final current commands Ie* and Ic* in the control unit 200 is executed according to the flowchart shown in FIG. 4. First, the control unit 200 reads the extension/contraction speed Vd of the damper 100 and a damping force command input from the vehicle control device (step S1). Next, the control unit 200 calculates the target pressures P1 and P2 within the extension-side chamber R1 and within the compression-side chamber R2 from the damping force command (step S2). Next, the control unit 200 calculates the deviations εe and εc between the target pressures P1 and P2 and the pressures Pe and Pc detected by the pressure sensors 2 and 3 (step S3). The control unit 200 then calculates the current commands Ie and Ic from the deviations εe and εc (step S4). Subsequently, the control unit 200 calculates the reduction amounts Me and Mc from the extension/contraction speed Vd of the damper 100 (step S5). Next, the control unit 200 calculates the final current commands Ie* and Ic* by subtracting the reduction amounts Me and Mc from the current commands Ie and Ic (step S6). Finally, the control unit 200 outputs the final current commands Ie* and Ic* to the drivers 37 and 39 that drive the solenoid valves S1 and S2 (step S7). The control unit 200 controls the extension-side solenoid valve S1 and the compression-side solenoid valve S2 by repeatedly executing the above processing procedure.

As explained above, the damper control device 1 calculates the final current commands Ie* and Ic* based on the pressures Pe and Pc and the extension/contraction speed Vd detected respectively by the extension-side pressure sensor 2, the compression-side pressure sensor 3, and the speed sensor 4, and controls the extension-side solenoid valve S1 and the compression-side solenoid valve S2 by the final current commands Ie* and Ic*.

As hardware of the damper control device 1, the following can be provided: an A/D converter (not illustrated) that takes in signals output by the extension-side pressure sensor 2, the compression-side pressure sensor 3, and the speed sensor 4; a storage device such as a ROM (Read Only Memory) in which programs necessary for executing the above-described control are stored; a computation device such as a CPU (Central Processing Unit) that executes processes based on the programs; and a storage device such as a RAM (Random Access Memory) that provides a storage region to the CPU. The processes in each unit of the control unit 200 are executed when the CPU executes the programs. The differentiator 28 of the speed sensor 4 can be integrated into the control unit 200. The vehicle control device and the control unit 200 can also be integrated.

Figure 5:
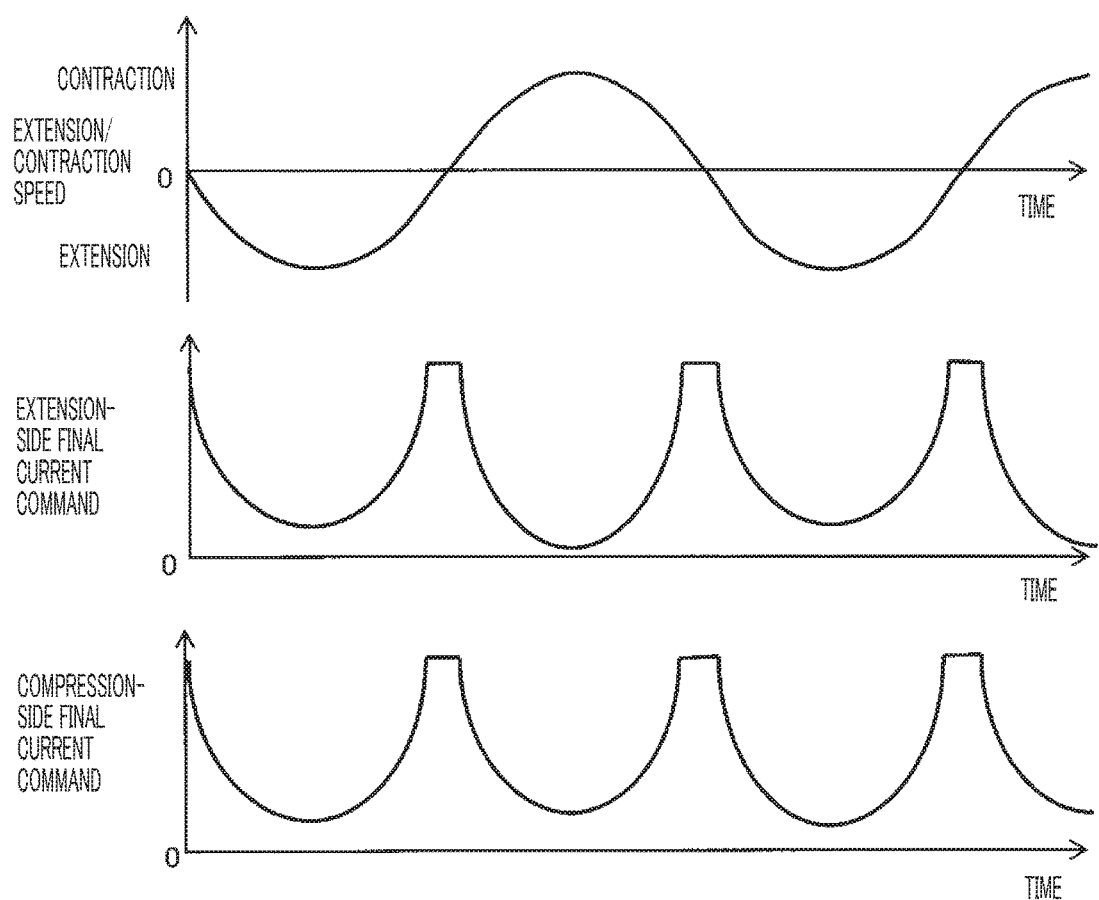
FIG. 5 illustrates current command waveforms generated by the damper control device according to the embodiment of the present invention.

When the damper 100 is extending, the extension-side current command Ie becomes the extension-side final current command Ie* without undergoing reduction correction, and a current based on the extension-side final current command Ie* is supplied to the extension-side solenoid valve S1. As a result, the pressure Pe of the extension-side chamber R1 is controlled to become the target pressure P1, and the extension-side damping force generated by the damper 100 can be set to the target damping force. On the other hand, the compression-side final current command Ic* undergoes reduction correction. Thus, as shown in FIG. 5, the current supplied to the compression-side solenoid valve S2, which does not affect the extension-side damping force when the damper 100 is extending, can be reduced.

When the damper 100 is contracting, the compression-side current command Ic becomes the compression-side final current command Ic* without undergoing reduction correction, and a current based on the compression-side final current command Ic* is supplied to the compression-side solenoid valve S2. As a result, the pressure Pc of the compression-side chamber R2 is controlled to become the target pressure P2, and the compression-side damping force generated by the damper 100 can be set to the target damping force. On the other hand, the extension-side final current command Ie* undergoes reduction correction. Thus, as shown in FIG. 5, the current supplied to the extension-side solenoid valve S1, which does not affect the compression-side damping force when the damper 100 is contracting, can be reduced.

In this way, in the damper control device 1, the current supplied to the solenoid valve which does not affect the damping force generated by the damper 100 among the extension-side solenoid valve S1 and the compression-side solenoid valve S2 can be reduced, and thus the power consumption can be reduced. Further, the currents supplied to the extension-side solenoid valve S1 and the compression-side solenoid valve S2 can be decreased compared to a conventional damper control device, and thus the amount of heat generated by the solenoids in the extension-side solenoid valve S1 and the compression-side solenoid valve S2 can be decreased. As a result, the thrust of the extension-side solenoid valve S1 and the compression-side solenoid valve S2 can be increased. As explained above, according to the damper control device 1, the power consumption of the solenoid valves S1 and S2 can be reduced, and the thrust of the solenoid valves S1 and S2 can be improved.

The reduction amounts Me and Mc in the reduction correction increase as the extension/contraction speed of the damper 100 increases, and decrease in the case that the extension/contraction speed Vd of the damper 100 is slow and switching between extension and contraction is repeated in a short duration of time. Therefore, during switching between extension/contraction of the damper 100, the currents supplied to the solenoid valves S1 and S2 become large, and thus the damping force can be generated with good responsiveness. As a result, good riding comfort of the vehicle can be maintained.

In addition, in the damper control device 1, the extension-side reduction correction is not performed when the absolute value |Vd| of the extension/contraction speed is less than the predetermined extension-side speed threshold value αe, and the compression-side reduction correction is not performed when the absolute value |Vd| of the extension/contraction speed is less than the predetermined compression-side speed threshold value αc. Therefore, when the extension/contraction speed Vd of the damper 100 is low and a switch between extension and contraction is anticipated, the reduction amounts Me and Mc decrease. Thus, during switching between extension/contraction of the damper 100, the currents supplied to the solenoid valves S1 and S2 are maintained high, and therefore the damping force can be generated with good responsiveness. As a result, good riding comfort of the vehicle can be maintained. In this way, good riding comfort of the vehicle can be maintained by providing a dead zone in which extension-side reduction correction and compression-side reduction correction are not performed in accordance with the extension/contraction speed Vd of the damper 100.

Next, a case in which the reduction correction is performed based on the extension/contraction state of the damper 100 will be explained.

Figure 6:
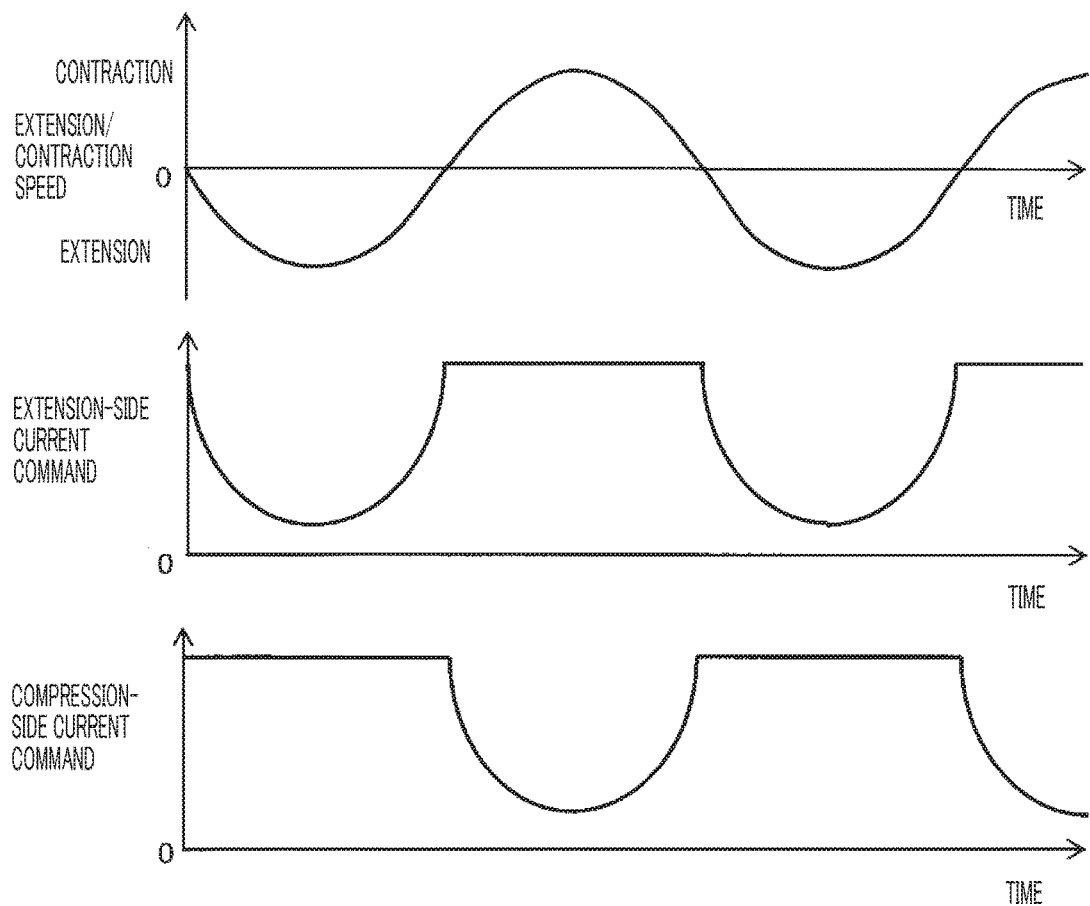
FIG. 6 illustrates one example of current command waveforms generated by a conventional damper control device.
Figure 7:
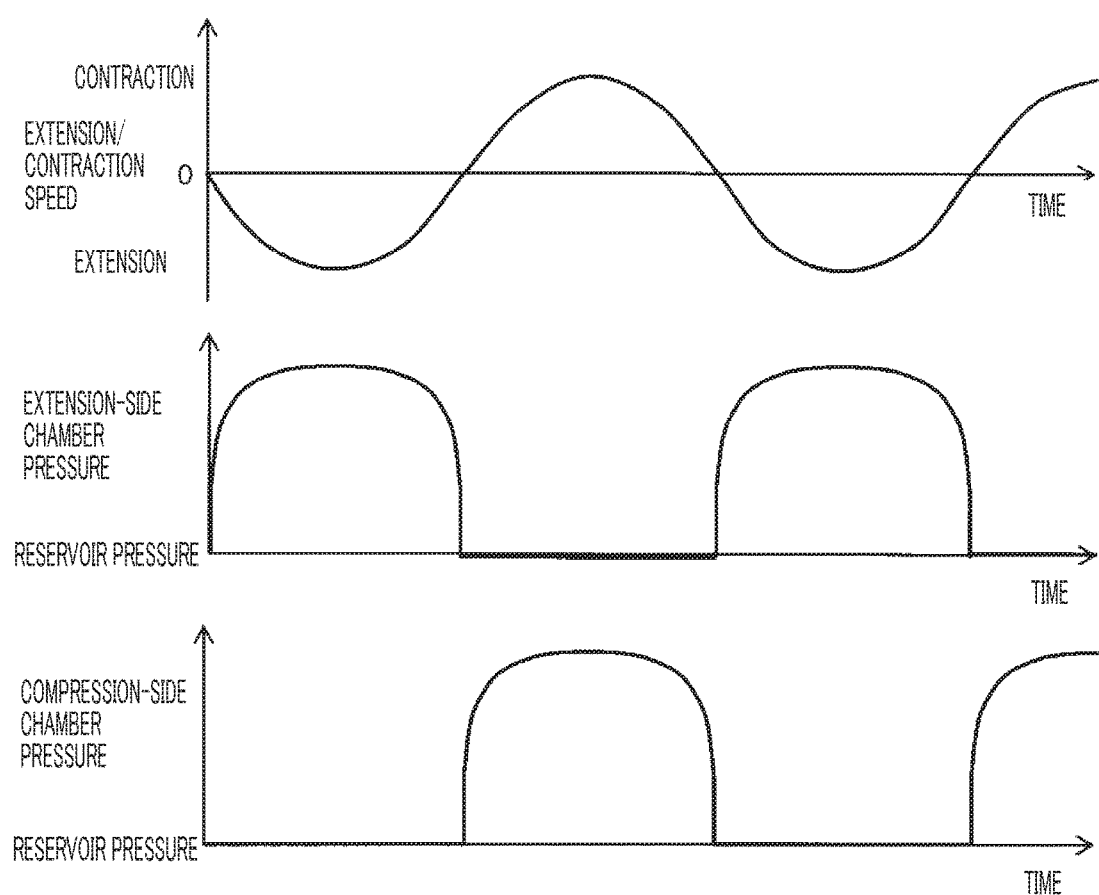
FIG. 7 illustrates transitions in a damper extension/contraction speed and an extension-side chamber pressure and a compression-side chamber pressure generated by a conventional damper control device.

Herein, as shown in FIG. 6, if an attempt is made to control the pressure within the extension-side chamber R1 to a constant level when the damper 100 is in the extension stroke, the current supplied to the extension-side solenoid valve S1 will increase as the absolute value |Vd| of the extension/contraction speed of the damper 100 decreases, and the current will decrease as the absolute value |Vd| of the extension/contraction speed increases. When the damper 100 is in the contraction stroke, if the current command is not reduced, the current supplied to the extension-side solenoid valve S1 will be maintained at a maximum level. Further, as shown in FIG. 7, when the damper 100 is in the contraction stroke, the pressure within the extension-side chamber R1 becomes the same as the pressure of the reservoir 50 regardless of the current that is supplied to the extension-side solenoid valve S1.

In this way, in the damper control device 1, when the damper 100 is in the contraction stroke, the pressure within the extension-side chamber R1 is the same as the pressure of the reservoir 50. However, the target pressure of the extension-side chamber R1, or in other words the pressure of the extension-side chamber R1 that is necessary for generating a predetermined damping force on the extension-side, is larger than the pressure of the reservoir 50. Therefore, when the damper 100 is in the contraction stroke, the extension-side deviation εe, which is the difference between the target pressure of the extension-side chamber R1 and the actual pressure within the extension-side chamber R1 (the reservoir pressure), increases, and the extension-side current command Ie before performing extension-side reduction correction becomes an extremely large value. Basically, the extension-side current command Ie before performing extension-side reduction correction reaches a value near the maximum value, and if the pressure Pe within the extension-side chamber R1 has reached the reservoir pressure, it can be determined that the damper 100 is in the contraction stroke. Whether or not the extension-side current command Ie has reached a value near the maximum value can be determined by, for example, providing a predetermined first extension-side current threshold value Ieref1 and determining whether the extension-side current command Ie is at or above the first extension-side current threshold value Ieref1. Whether or not the pressure Pe within the extension-side chamber R1 has reached the reservoir pressure can be determined by, for example, providing a predetermined extension-side pressure threshold value and determining whether the pressure Pe within the extension-side chamber R1 is at or below the extension-side pressure threshold value.

Similarly, in the damper control device 1, when the damper 100 is in the extension stroke, the pressure within the compression-side chamber R2 is the same as the pressure of the reservoir 50. However, the target pressure of the compression-side chamber R2, or in other words the pressure of the compression-side chamber R2 that is necessary for generating a predetermined damping force on the compression-side, is larger than the pressure of the reservoir 50. Therefore, when the damper 100 is in the extension stroke, the compression-side deviation εc, which is the difference between the target pressure of the compression-side chamber R2 and the actual pressure within the compression-side chamber R2 (the reservoir pressure), increases, and the compression-side current command Ic before performing compression-side reduction correction becomes an extremely large value. Basically, the compression-side current command Ic before performing compression-side reduction correction reaches a value near the maximum value, and if the pressure Pc within the compression-side chamber R2 has reached the reservoir pressure, it can be determined that the damper 100 is in the extension stroke. Whether or not the compression-side current command Ic has reached a value near the maximum value can be determined by, for example, providing a predetermined first compression-side current threshold value Icref1 and determining whether the compression-side current command Ic is at or above the first compression-side current threshold value Icref1. Whether or not the pressure Pc within the compression-side chamber R2 has reached the reservoir pressure can be determined by, for example, providing a predetermined compression-side pressure threshold value and determining whether the pressure Pc within the compression-side chamber R2 is at or below the compression-side pressure threshold value.

In this way, in the damper control device 1, the extension/contraction state of the damper 100 can be understood without using the speed sensor 4. Therefore, the necessity of the extension-side reduction correction and the compression-side reduction correction can be determined based on the extension/contraction state of the damper 100 instead of the extension/contraction speed Vd of the damper 100.

When it has been determined that the damper 100 is in the extension stroke, instead of calculating the compression-side reduction amount Mc based on the extension/contraction speed Vd of the damper 100 to calculate the compression-side final current command Ic*, the compression-side final current command Ic* of the compression-side solenoid valve S2 can be set to be equal to the extension-side final current command Ie* of the extension-side solenoid valve S1. Alternatively, the compression-side final current command Ic* can be set to the result of multiplying the extension-side final current command Ie* by a predetermined gain k1. In other words, if the final compression-side final current command Ic* of the compression-side solenoid valve S2 is calculated using an equation in which the compression-side final current command Ic*=Ie* or the compression-side final current command Ic*=Ie*·k1, the current supplied to the compression-side solenoid valve S2 can be reduced similar to the case in which the compression-side reduction amount Mc is calculated using the extension/contraction speed Vd.

Similarly, when it has been determined that the damper 100 is in the contraction stroke, instead of calculating the extension-side reduction amount Me based on the extension/contraction speed Vd of the damper 100 to calculate the extension-side final current command Ie*, the extension-side final current command Ie* of the extension-side solenoid valve S1 can be set to be equal to the compression-side final current command Ic* of the compression-side solenoid valve S2. Alternatively, the extension-side final current command Ie* can be set to the result of multiplying the compression-side final current command Ic* by a predetermined gain k2. In other words, if the final extension-side final current command Ie* of the extension-side solenoid valve S1 is calculated using an equation in which the extension-side final current command Ie*=Ic* or the extension-side final current command Ie*=Ic*·k2, the current supplied to the extension-side solenoid valve S1 can be reduced similar to the case in which the extension-side reduction amount Me is calculated using the extension/contraction speed Vd.

The extension-side final current command Ie* decreases as the damper 100 switches from the contraction stroke to the extension stroke and the absolute value |Vd| of the extension/contraction speed increases. Therefore, a condition in which the extension-side final current command Ie* is at or below a predetermined second extension-side current threshold value Ieref2 can be added as a further condition for performing compression-side reduction correction. In this way, by providing a dead zone in which compression-side reduction correction is not performed, good riding comfort of the vehicle can be maintained. The value of the extension-side final current command Ie* at this time is the same as the value of the extension-side current command Ie, and thus a condition in which the extension-side current command Ie is at or below the second extension-side current threshold value Ieref2 can be set as a condition for performing compression-side reduction correction.

Similarly, the compression-side final current command Ic* decreases as the damper 100 switches from the extension stroke to the contraction stroke and the absolute value |Vd| of the extension/contraction speed increases. Therefore, a condition in which the compression-side final current command Ic* is at or below a predetermined second compression-side current threshold value Icref2 can be added as a further condition for performing extension-side reduction correction. In this way, by providing a dead zone in which extension-side reduction correction is not performed, good riding comfort of the vehicle can be maintained. The value of the compression-side final current command Ic* at this time is the same as the value of the compression-side current command Ic, and thus a condition in which the compression-side current command Ic is at or below the second compression-side current threshold value Icref2 can be set as a condition for performing extension-side reduction correction.

Next, a case in which reduction correction is performed based on the pressure Pe of the extension-side chamber R1 and the pressure Pc of the compression-side chamber R2 will be explained.

There are cases in which the extension-side solenoid valve S1 and the compression-side solenoid valve S2 have override characteristics that a control pressure rises along with an increase in the extension/contraction speed, or in other words an increase in a flow amount. There are also cases in which an overall valve, in which the extension-side damping valve 21 or the compression-side damping valve 25 and the compression-side auxiliary damping valve 22 are included in the extension-side solenoid valve S1 and the compression-side solenoid valve S2, has override characteristics that a control pressure rises along with an increase in the extension/contraction speed, or in other words an increase in a flow amount. In such cases, even if an attempt is made to control the pressures within the extension-side chamber R1 and the compression-side chamber R2 to a constant level, the pressure Pe of the extension-side chamber R1 or the pressure Pc of the compression-side chamber R2 exhibits a tendency to rise as the absolute value |Vd| of the extension/contraction speed increases as shown in FIG. 7. In other words, it can be determined whether the absolute value |Vd| of the extension/contraction speed is in a large state from a change in the pressure Pe of the extension-side chamber R1 and a change in the pressure Pc of the compression-side chamber R2. Therefore, predetermined threshold values can be provided for the pressure Pe of the extension-side chamber R1 and the pressure Pc of the compression-side chamber R2, and compression-side reduction correction can be performed when the pressure Pe exceeds the threshold value and extension-side reduction correction can be performed when the pressure Pc exceeds the threshold value. Further, as shown in FIG. 7, the pressure Pe of the extension-side chamber R1 and the pressure Pc of the compression-side chamber R2 exhibit a correlation with the extension/contraction speed Vd. Therefore, the compression-side reduction amount Mc can be calculated based on a pressure change of the pressure Pe of the extension-side chamber R1 when the damper 100 is in the extension stroke, or based on the extension-side current command Ie which exhibits a change tendency similar to that of the pressure change, without using the output of the speed sensor 4. Similarly, the extension-side reduction amount Me can be calculated based on a pressure change of the pressure Pc of the compression-side chamber R2 when the damper 100 is in the contraction stroke, or based on the compression-side current command Ic which exhibits a change tendency similar to that of the pressure change.

There are cases in which the extension-side solenoid valve S1 and the compression-side solenoid valve S2 are pressure control valves capable of performing pressure control that is proportional to a supplied current without the need to adjust the supplied current or the like. In such a case, the pressure Pe of the extension-side chamber R1 and the pressure Pc of the compression-side chamber R2 change proportional to the currents supplied to the extension-side solenoid valve S1 and the compression-side solenoid valve S2. Therefore, the extension-side pressure sensor 2 and the compression-side pressure sensor 3 can be eliminated, and the extension-side solenoid valve S1 and the compression-side solenoid valve S2 can be controlled based on only the extension/contraction speed Vd detected by the speed sensor 4.

The embodiments of the present invention described above are merely illustration of some application examples of the present invention and not of the nature to limit the technical scope of the present invention to the specific constructions of the above embodiments.

The present application claims a priority based on Japanese Patent Application No. 2014-148447 filed with the Japan Patent Office on Jul. 22, 2014, all the contents of which are hereby incorporated by reference.

The invention claimed is:

1. A damper control device for controlling a damping force of a damper having an extension-side chamber and a compression-side chamber which are filled with a working fluid, wherein
 the damper control device is configured to feed back a pressure within the extension-side chamber to control an extension-side solenoid valve that adjusts the pressure within the extension-side chamber, and feeds back a pressure within the compression-side chamber to control a compression-side solenoid valve that adjusts the pressure within the compression-side chamber,
 the damper control device is configured to perform a calculation to reduce a compression-side current supplied to the compression-side solenoid valve during extension of the damper for a compression-side reduction correction, and
 the damper control device is configured to perform a calculation to reduce an extension-side current supplied to the extension-side solenoid valve during contraction of the damper for an extension-side reduction correction.

2. The damper control device according to claim 1, wherein
 the extension-side reduction correction is a correction that subtracts an extension-side reduction amount calculated based on an extension/contraction speed of the damper from the extension-side current, and
 the compression-side reduction correction is a correction that subtracts a compression-side reduction amount calculated based on the extension/contraction speed of the damper from the compression-side current.

3. The damper control device according to claim 2, wherein
 the extension-side reduction correction is not performed if an absolute value of the extension/contraction speed of the damper is less than an absolute value of a predetermined extension-side speed threshold value, and
 the compression-side reduction correction is not performed if the absolute value of the extension/contraction speed of the damper is less than an absolute value of a predetermined compression-side speed threshold value.

4. The damper control device according to claim 1, wherein
 the compression-side reduction correction is a correction that replaces the compression-side current with the extension-side current, and
 the extension-side reduction correction is a correction that replaces the extension-side current with the compression-side current.

5. The damper control device according to claim 4, wherein
 the extension-side reduction correction is performed when the extension-side current is at or above a first extension-side current threshold value and the pressure within the extension-side chamber is at or below an extension-side pressure threshold value, and
 the compression-side reduction correction is performed when the compression-side current is at or above a first compression-side current threshold value and the pressure within the compression-side chamber is at or below a compression-side pressure threshold value.

6. The damper control device according to claim 4, wherein
 the extension-side reduction correction is performed when the extension-side current is at or above a first extension-side current threshold value, the pressure within the extension-side chamber is at or below an extension-side pressure threshold value, and the compression-side current is at or below a second compression-side current threshold value, and
 the compression-side reduction correction is performed when the compression-side current is at or above a first compression-side current threshold value, the pressure within the compression-side chamber is at or below a compression-side pressure threshold value, and the extension-side current is at or below a second extension-side current threshold value.

* * * * *